United States Patent [19]
Ebert et al.

[11] Patent Number: 4,760,127
[45] Date of Patent: Jul. 26, 1988

[54] PROCESS FOR THE PREPARATION OF POLYARYLENE SULPHIDE WITH MONOHALOGENO AROMATIC COMPOUND AND MONO MERCAPTO COMPOUND

[75] Inventors: Wolfgang Ebert; Karsten Idel, both of Krefeld, Fed. Rep. of Germany

[73] Assignee: Bayer AG, Leverkusen, Fed. Rep. of Germany

[21] Appl. No.: 893,601

[22] Filed: Aug. 6, 1986

[30] Foreign Application Priority Data

Aug. 17, 1985 [DE] Fed. Rep. of Germany ....... 3529501

[51] Int. Cl.$^4$ ............................................. C08G 75/16
[52] U.S. Cl. .................................................. 528/388
[58] Field of Search ......................................... 528/388

[56] References Cited

U.S. PATENT DOCUMENTS 3,386,950 6/1968 Horvath et al. .................. 260/45.7
3,870,686 3/1975 Campbell .......................... 260/79.1

FOREIGN PATENT DOCUMENTS 53344 6/1982 European Pat. Off. .
100536 2/1984 European Pat. Off. .

Primary Examiner—Harold D. Anderson
Attorney, Agent, or Firm—Connolly & Hutz

[57] ABSTRACT

The invention relates to a process for the preparation of optionally branched, high molecular weight polyarylene sulphides with melt viscosities which can be established within a defined range and low corrosion.

These polyarylene sulphides have been obtained by reacting alkali metal sulphides, if appropriate mixed with alkali metal bisulphides and reaction accelerators, with dihalogenoaromatics and polyhalogenoaromatics, with the addition of monohalogen and monomercapto compounds.

12 Claims, No Drawings

PROCESS FOR THE PREPARATION OF POLYARYLENE SULPHIDE WITH MONOHALOGENO AROMATIC COMPOUND AND MONO MERCAPTO COMPOUND

The invention relates to a process for the preparation of high molecular weight, optionally branched polyarylene sulphides from alkali metal sulphides and dihalogenoaromatics in a polar solvent in the presence of 0.05 to 5.0 mol %, preferably 0.1 to 2.5 mol %, of in each case a monohalogen and a monomercapto compound. The resulting polyarylene sulphides of defined melt viscosities are distinguished by a high stability of the melt and low corrosion.

Polyarylene sulphides and their preparation are known (for example U.S. Pat. Nos. 2,513,188 and 3,117,620).

Thus it is known that the addition of inorganic or organic salts to the reaction mixture leads to a reduction in the melt flow or to an increase in the melt viscosity of the polyphenylene sulphides obtained. Only if the melt viscosity is sufficiently high can polyphenylene sulphides be processed by thermoplastic methods, for example to injection-moulded components, films and fibres. Without addition of the abovementioned salts, polyphenylene sulphides which achieve the necessary low melt flow only via a separate and additional postcondensation or hardening (curing) are obtained.

It is known that, for example, alkali metal carboxylates (DE-AS (German Published Specification) No. 2,453,749), lithium halides or alkali metal carboxylates (DE-OS (German Published Specification) No. 2,623,362), lithium chloride or lithium carboxylate (DE-OS (German Published Specification) No. 2,623,363), alkali metal carbonates in combination with alkali metal carboxylates (U.S. Pat. No. 4,038,259), lithium acetate (DE-OS (German Published Specification) No. 2,623,333), tri-alkali metal phosphates (DE-OS (German Published Specification) No. 2,930,710), tri-alkali metal phosphonates (DE-OS (German Published Specification) No. 2,930,797), alkali metal fluorides (DE-OS (German Published Specification) No. 3,019,732), alkali metal sulphonates (U.S. Pat. No. 4,038,260) and lithium carbonate and lithium borate have been used as catalysts (U.S. Pat. No. 4,030,518).

In DE-OS (German Published Specification) No. 3,120,538, polyarylene sulphides with high melt viscosities are furthermore obtained by addition of N,N-dialkylcarboxylic acid amides to the reaction mixture.

The use of polar solvents for the preparation of polyarylene sulphides is likewise described there.

It has now been found that polyarylene sulphides which have melt viscosities which can be established reproducibly and are distinguished by a high stability of the melt and low corrosion during processing have been obtained by addition of certain monohalogen and monomercapto compounds to the reaction mixture.

The invention therefore relates to a process for the preparation of optionally branched polyarylene sulphides from (a) 50 to 100 mol % of dihalogenoaromatics of the formula

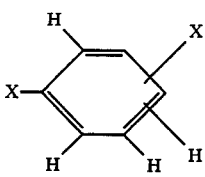

and 0 to 50 mol % of dihalogenoaromatics of the formula

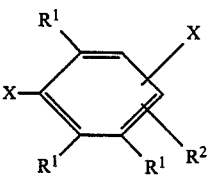

in which the radicals X represent halogen, such as chlorine or bromine, in the meta- and para-position relative to one another and the radicals $R^1$ and $R^2$ is identical or different and can be hydrogen, $C_1$–$C_4$-alkyl, $C_5$–$C_{10}$-cycloalkyl, $C_6$–$C_{10}$-aryl, $C_7$–$C_{10}$-alkylaryl or $C_7$–$C_{14}$-arylalkyl, it being possible for two radicals $R^1$ in the ortho-position relative to one another to be linked to form an aromatic ring or a heterocyclic ring containing up to three heteroatoms, such as N, O or S, and one radical $R^1$ always being other than hydrogen, and (b) 0 to 5 mol %, preferably 0.1 to 2.5 mol %, based on the sum of the dihalogenoaromatics of the formula I and II, of a tri- or tetrahalogenoaromatic of the formula (III)

$$ArX_n \qquad (III)$$

wherein

Ar is an aromatic $C_6$–$C_{14}$ radical or a heterocyclic radical with 5 to 14 ring atoms, it being possible for up to 3 ring C atoms to be replaced by heteroatoms, such as N, O or S, X represents halogen, such as chlorine or bromine, and n represents the number 3 or 4, and (c) 50 to 100 mol % of an alkali metal sulphide, preferably sodium sulphide or potassium sulpide or a mixture thereof, for example in the form of their hydrates or aqueous mixtures, if appropriate together with small amounts of alkali metal hydroxides, such as sodium hydroxide and potassium hydroxide, and 0 to 50 mol % of an alkali metal bisulphide, preferably sodium bisulphide or potassium bisulphide, or a mixture thereof, it being possible for the molar ratio of (a+b):c to be in the range from 0.75:1 to 1.25:1, and (d) if appropriate in the presence of reaction accelerators, such as alkali metal carboxylates, alkali metal phosphates, alkali metal phosphonates, alkali metal fluorides or alkali metal alkylsulphonates, or in the presence of N,N-dialkylcarboxylic acid amides, lactams, anhydrides and esters of carboxylic acids, characterized in that monohalogenoaromatics of the formula IV $$W\text{—}A\text{—}R \qquad (IV)$$

are added to the reaction mixture in amounts of 0.05 to 5.0 mol %, preferably 0.1 to 2.5 mol %, wherein
W is a replaceable group selected from the group comprising halogen, such as Cl, Br and I, mesylate and tosylate, preferably Cl or Br,
A is an aliphatic, aromatic or heterocyclic radical with 6 to 30 C atoms, for example

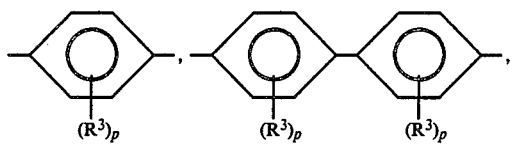

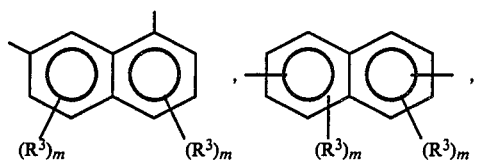

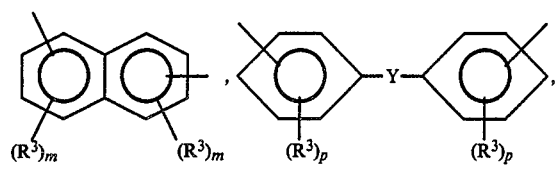

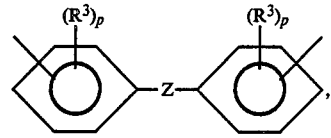

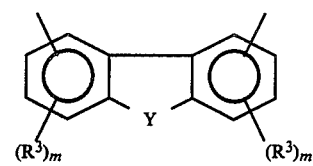

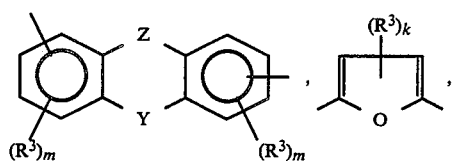

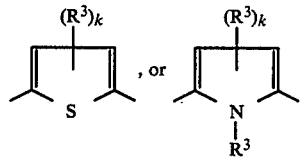

wherein
the radicals $R^3$ independently of one another denote $C_1$-$C_8$-alkyl; $C_7$-$C_{19}$-alkaryl/aralkyl, $C_3$-$C_6$-cycloalkyl or hydrogen and
Z represents $C_1$-$C_6$-alkylidene, $C_3$-$C_6$-cycloalkylidene, CO, —S—, —$SO_2$—, O or a chemical single bond and
Y denotes O, $NR^3$, S, $SO_2$ or CO, and furthermore
k, m and p are integers, and in particular
k represents the number 0, 1 or 2
m represents the number 0, 1, 2, or 3
p represents the number 0, 1, 2, 3, or 4
R has the meaning of $R^3$, and of a monomercapto compound of the formula V

(R—A—S)$_t$—W    (V)

which are added in amounts of 0.05 mol % to 5.0 mol %, preferably 0.1 to 2.5 mol %,
wherein
SW is a mercapto or mercaptide group, in which
W represents hydrogen, Li, Na, K or $NH_4^+$, if t=1, or represents Mg, Ca, Ba or Zn, if t=2, and
A is an aliphatic, aromatic or heterocyclic radical with 1 to 30 C atoms, for example

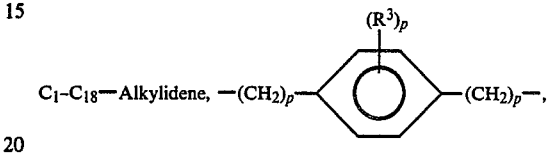

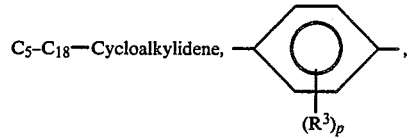

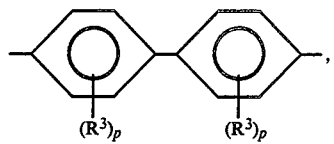

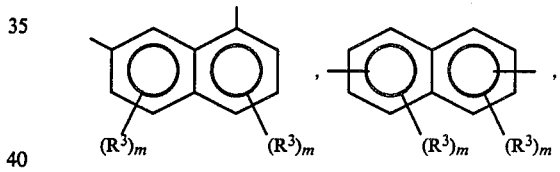

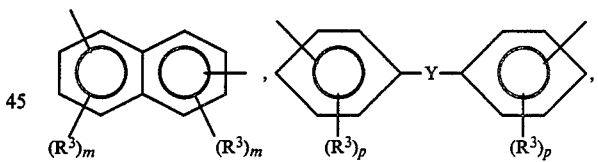

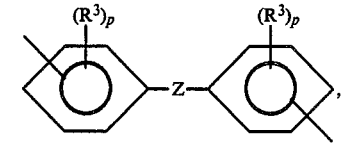

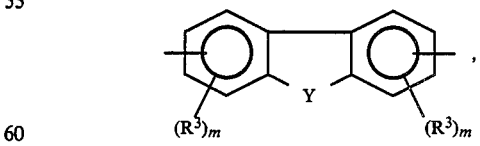

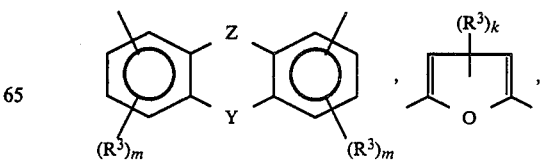

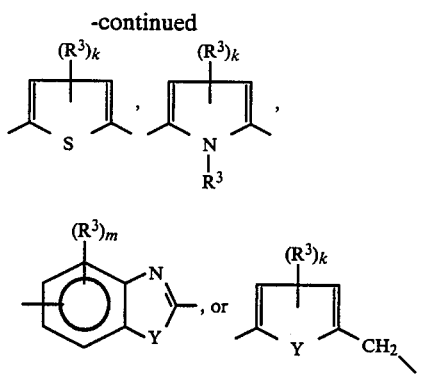

and

Z, Y, k, m, p and $R^3$ have the meaning given in the case of formula IV.

The alkali metal sulphides are preferably employed in the form of their hydrates and aqueous mixtures or aqueous solutions. Dehydration can be partial, but is preferably carried out completely. The water present in the reaction mixture is distilled out of the batch. The distillation of the water can be carried out directly or with the aid of agents which form azeotropes, the dihalogenoaromatics preferably being employed as agents which form an azeotrope. For the dehydration, all the reaction partners can be mixed and dehydration of the entire mixture can be carried out. The alkali metal sulphide can also be dehydrated separately with some of the reaction components or by itself.

In one embodiment of the reaction, the reaction partners are continuously brought together with the reaction accelerator or a mixture of reaction accelerators in the presence of the polar solvent, the water being simultaneously removed. In this procedure, a reaction which starts can be controlled via the rates of metering. Longer residence times of the water can thus also be avoided.

If complete dehydration is carried out, the reaction can be carried out under normal pressure or under a low pressure of up to about 3 bar. To achieve higher reaction temperatures above the boiling point of the solvent or of the mixture of the solvent and di- and polyhalogenoaromatics, a higher pressure of up to 50 bar can be applied.

The reaction can be carried out continuously or discontinuously. The reaction time can be varied within a wide range. It can be from 1 to 48 hours, preferably 1 to 18 hours. The reaction temperatures are between 150° and 300° C., preferably between 170° and 280° C.

The mercapto compound V and the monohalogen compound IV can be added in various ways. Thus, for example, the monohalogen compound can initially be taken, whilst the mercapto compound is added at a particular point in the subsequent stirring period, or the reverse procedure can be followed. It is furthermore possible for either the mercapto compound or the monohalogen compound to be initially taken whilst the other particular compound is metered in continuously during the reaction or post-condensation period; furthermore, both compounds can be metered in or added in portions at certain intervals of time in the reaction or subsequent stirring phase. In all cases, both defined compounds and also mixtures of various monohalogen compounds or mixtures of various mercapto compounds can be used.

The polyarylene sulphides prepared according to the invention are distinguished by defined melt viscosities which can be reproduced within a narrow range. This is of great importance inasmuch as polymer melts with different flow properties which must be adapted to suit the particular intended use must be established for processing the polyarylene sulphides.

Thus, for example, higher melt viscosities are required for the production of films and fibres than for establishing injection moulding grades reinforced with glass fibres or glass fibres/mineral.

Another advantage of the polyarylene sulphides prepared according to the invention is their high stability under exposure to heat. Only thus is it guaranteed that no further build-up or degradation which can lead to a complete change in the pattern of properties can occur during thermoplastic processing. The regenerated material can also be reused again after processing.

Corrosion which leads to impurities in the PPS and to wear on processing machines is in general observed during thermoplastic processing or on contact of PPS melts with metal surfaces. Fortunately, with the polyarylene sulphides prepared according to the invention, this corrosion is reduced, even under severe exposure to heat.

The reaction mixture can be worked up and the polyarylene sulphides can be isolated in a known manner.

The polyarylene sulphide can be separated off directly from the reaction solution or, for example, after first adding water and/or dilute acids or organic solvents with a low solubility for polyarylene sulphides, by the customary procedures, for example by filtration or by centrifugation. After the polyarylene sulphide has been separated off, it is in general subsequently washed with water. Washing or extraction with other washing liquids, which can also be carried out in addition to or after this washing, is also possible.

The polyarylene sulphide can also be obtained, for example, by distilling off the solvent and subsequent washing, as described above.

The alkali metal sulphides can also be obtained, for example, from $H_2S$ and alkali metal hydroxides.

Certain amounts of alkali metal hydroxide can additionally be metered in, depending on the amount of alkali metal bisulphide contained in the reaction solution as an impurity in the alkali metal sulphide. If appropriate, those compounds which split off or form alkali metal hydroxides under the reaction conditions can also be added, instead of the alkali metal hydroxides.

According to the invention, meta- and para-dihalogenoaromatics of the formula (I) and (II) can be employed. In this case, the ratio of meta- to para-dihalogenoaromatics can be up to 30:70.

p-Dihalogenoaromatics are preferably used to obtain polyphenyl sulphides which can be processed as thermoplastics.

If branched polyarylene sulphides are to be prepared, at least 0.05 mol % of a tri- or tetrahalogenoaromatic of the formula (III) should be employed.

Examples of dihalogenoaromatics of the formula (I) which are to be employed according to the invention are: p-dichlorobenzene, p-dibromobenzene, 1-chloro-4-bromobenzene, 1,3-dichlorobenzene, 1,3-dibromobenzene and 1-chloro-3-bromobenzene. They can be used by themselves or as a mixture with one another. 1,4-Dichlorobenzene and/or 1,4-dibromobenzene are particularly preferred.

Examples of dihalogenoaromatics of the formula (II) which are to be employed according to the invention are: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,4-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene and 1-cyclohexyl-3,5-dichlorobenzene. They can be employed by themselves or as a mixture with one another.

Examples of tri- or tetrahalogenoaromatics of the formula (III) which are to be employed according to the invention are: 1,2,3-trichlorobenzene, 1,2,4-trichlorobenzene, 1,2,4-tribromobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl and 1,3,5-trichlorotriazine.

In general, any polar solvent which guarantees a sufficient solubility of the organic and, if appropriate, inorganic reactants under the reaction conditions can be employed for the reaction. N-Alkyllactams are preferably used.

N-Alkyllactams are those of amino acids with 3 to 11 C atoms, which can optionally carry substituents which are inert under the reaction conditions on the carbon skeleton.

Examples of N-alkyllactams which are used are: N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isobutyl-2-piperidone, N-methyl-6-methyl-2-piperidone and N-methyl-3-ethyl-2-piperidone.

Mixtures of the above solvents can be chosen.

Examples of monohalogenoaromatics and heterocyclic compounds which can be employed according to the invention are 3-chlorodiphenyl, 4-chlorodiphenyl, 3-bromodiphenyl, 4-chlorodiphenyl, 2-chlorodiphenyl ether, 4-chlorodiphenyl ether, 2-bromodiphenyl ether, 4-bromodiphenyl ether, 2-chlorodiphenyl sulphide, 3-chlorodiphenyl sulphide, 4-chlorodiphenyl sulphide, 2-bromodiphenyl sulphide, 3-bromodiphenyl sulphide, 4-bromodiphenyl sulphide, 2-chlorodiphenyl sulphoxide, 4-chlorodiphenyl sulphoxide, 2-bromodiphenyl sulphoxide, 4-bromodiphenyl sulphoxide, 2-chlorodiphenyl sulphone, 3-chlorodiphenyl sulphone, 4-chlorodiphenyl sulphone, 2-bromodiphenyl sulphone, 3-bromodiphenyl sulphone, 4-bromodiphenyl sulphone, (4-chlorophenyl)phenylmethane, 2-(4-chlorophenyl)-2-phenylpropane, 2-(4-chloro-3,5-dimethylphenyl)-2-phenylpropane, (4-bromophenyl)phenylmethane, 2-(4-bromophenyl)-2-phenylpropane, 2-(4-bromo-3,5-dimethylphenyl)-2-phenylpropane, 1-chloronaphthalene, 2-chloronaphthalene, 1-bromonaphthalene, 2-bromonaphthalene, 2-chlorofuran, 2-chloropyrrole, 2-chlorothiophene, 2-bromofuran, 2-bromopyrrole, 2-bromothiophene, (3-chlorophenyl)phenyl ketone, 4-chlorophenyl phenyl ketone, (3-bromophenyl)phenyl ketone and (4-bromophenyl)phenyl ketone.

Compounds which are preferably used are: 3-chlorodiphenyl, 3-bromodiphenyl, 4-chlorodiphenyl, 4-bromodiphenyl, 3-chlorodiphenyl sulphide, 3-bromodiphenyl sulphide, 4-chlorodiphenyl sulphide, 4-bromodiphenyl sulphide, 3-chlorodiphenyl sulphone, 3-bromodiphenyl sulphone, 4-chlorodiphenyl sulphone, 4-bromodiphenyl sulphone, 3-chlorodiphenyl ketone, (3-bromophenyl)phenyl ketone, (4-chlorophenyl)phenyl ketone and (4-bromophenyl)phenyl ketone.

Examples of monomercapto compounds which can be employed according to the invention are: butylmercaptan, dodecylmercaptan, stearylmercaptan, benzylmercaptan, thiophenol, 1-mercaptonaphthalene, 2-mercaptonaphthalene, 4-mercaptodiphenyl, 4-mercaptodiphenyl ether, 4-mercaptodiphenyl sulphone, 4-mercaptodiphenyl sulphide, 4-mercaptodiphenyl ketone, 2-mercaptobenzoxazole, 2-mercaptobenzothiazole and 2-mercaptobenzimidazole, in addition to Li, Na, K, NH$_4$, Ca, Mg or Zn mercaptides thereof.

Compounds which are preferably employed are dodecylmercaptan, stearylmercaptan, benzylmercaptan, thiophenol, 2-mercaptobenzimidazole, 2-mercaptobenzothiazole, Na stearylmercaptide, Na thiophenolate, Na 2-mercaptobenzimidazole, Na 2-mercaptobenzothiazole and Zn salts of 2-mercaptobenzimidazole and of 2-mercaptobenzothiazole.

If appropriate, the reaction can additionally be carried out in the presence of customary reaction accelerators, such as, for example: alkali metal carboxylates (DE-AS (German Published Specification) No. 2,453,749), lithium halides or alakli metal carboxylates (DE-OS (German Published Specification) No. 2,623,362), lithium chloride or lithium carboxylate (DE-OS (German Published Specification) No. 2,623,363), alkali metal carbonates in combination with alkali metal carboxylates (U.S. Pat. No. 4,038,259), lithium acetate (DE-OS (German Published Specification) No. 2,623,333), tri-alkali metal phosphates (DE-OS (German Published Specification) No. 2,930,710), tri-alkali metal phosphonates (DE-OS (German Published Specification) No. 2,930,797), alkali metal fluorides (DE-OS (German Published Specification) No. 3,019,732), alkali metal sulphonates (U.S. Pat. No. 4,038,260), lithium carbonate and lithium borate (U.S. Pat. No. 4,030,518), aminoacids (Le A 23 256), defined amounts of lactam (Le A 23 080), anhydrides and esters of carboxylic acids (Le A 23 079) and N,N-dialkylcarboxylic acid amides.

The polyarylene sulphides according to the invention can be mixed with other polymers, such as pigments and fillers—for example graphite, metallic powders, glass powder, quartz flour, glass fibres or carbon fibres—or the additives customary for polyarylene sulphides, for example customary stabilizers or mould release agents, can be added.

The melt flow properties of polyarylene sulphides are in general measured in accordance with ASTM 1238-70 at 316° C. using a 5 kg weight and are quoted in g/10 minutes.

If the melt flow values are high, however, this measurement can present difficulties because of the high discharge rate of the polymer melt.

The melt viscosity $\eta m$ of the polymer melt has therefore been determined (in Pa·s) at 306° C. as a function of the shearing stress (in Pa) with the aid of an Instron rotation viscometer.

The melt viscosity can be determined in a very wide range from $10^{-1}$ to $10^7$ Pa·s in this manner. In the Instron rheometer, the polymer is melted between a fixed plate and a rotatable cone and the torque of the cone is determined. From the torque, the angular viscosity and the apparatus data, the melt viscosity can be calculated as a function of the shearing stress. The rheometer model 3250 from Instron was used; diameter of the cone and of the plate 2 cm. The melt viscosity measured at a shearing stress of $\tau = 10^2$ Pa is stated.

After isolation from the reaction mixture, the polyarylene sulphides according to the invention have melt viscosities between 1 and $5 \times 10^3$, preferably 5 to $1 \times 10^3$ Pa·s. They can be processed in the customary manner. Films, fibres and, preferably, injection moulding compositions are thereby obtained. These can be used, for example, as automobile components, fittings, electrical components, for example switches, electronic boards, components and apparatuses which are resistant to chemicals and stable to weathering, such as pump housings and pump impellers, etching bath dishes, sealing rings, components of office machines and communication equipment and as domestic appliances, valves, ball bearing components, embedding compositions for electronic components and the like.

Polyarylene sulphides can be analyzed by chromatographic processes to obtain information on their molecular weight and molecular weight distribution.

High pressure liquid chromatography (HPLC) or gel permeation chromatography (GPC), for example, are suitable here.

The customary carrier materials, for example LiChroprep ®, Lobar ®, LiChrosorb ®, LiChrospher ®, Perisorb ®, Hibar ®, Fractogel ®, Fractosil ®, Ultrastyragel ®, Microstyragel ®, Zorbax ®, Bondagel ® and Shodex ®, can be used as the stationary phase.

The customary solvents can be used as the solvent and mobile phase. These should dissolve the polymer sufficiently.

Suitable examples are 1-chloronaphthalene, diphenyl, N-methylpyrrolidone, N-cyclohexylpyrrolidone, N-methylpiperidone, N-methylcaprolactam, N-methyllaurinelactam, sulpholane, N,N'-dimethylimidazolidinone, N,N'-dimethylpiperazinone, hexamethylphosphoric acid triamide, 1-methyl-1-oxo-phospholane and mixtures thereof.

Absolute or relative calibrations can be carried out in the chromatographic analytical methods. Examples of suitable calibration substances for relative are customary polymers, such as, for example, polystyrene, polyethylene, polyethylene terephthalate, polybutylene terephthalate, polyesters, such as purely aromatic polyesters, polycarbonate, polyamides, such as PA 6, PA 66 and PA 11, polysulphones or polyether-sulphones.

The chromatography for analytical determination of the molecular weights or molecular weight distribution can be used under various pressures from 1 to 10 bar.

The chromatographic determination is carried out at a temperature from room temperature to 250° C.

Substances such as alkali metal halides, alkaline earth metal carboxylates and phosphonium or ammonium compounds can furthermore be added to the sample to be analysed to improve the measurement accuracy.

The weight-average molecular weights $M_w$ can be stated in the evaluation of the analytical data thus obtained. These are 15,000 to 150,000, preferably 15,000 to 100,000 and particularly preferably 15,000 to 80,000.

EXAMPLES

Example 1

This example describes, for comparison, the preparation of polyphenylene sulphide according to U.S. Pat. No. 3,354,129, 1,2,4-trichlorobenzene being metered in as a branching agent to increase the melt viscosity.

129 g of sodium sulphide tri-hydrate (corresponding to 1 mole of $Na_2S$) and 300 g of N-methyl-2-pyrrolidone were brought together in an autoclave equipped with stirrers. The mixture was flushed with nitrogen and slowly warmed up to 202° C. A total of 19 ml of water thereby distilled off. The mixture was then cooled down to about 160° C. and 147 g of p-dichlorobenzene (=1 mole) and 1.81 g of 1,2,4-trichlorobenzene (1 mol %, based on the moles of p-dichlorobenzene) in about 50 g of N-methyl-2-pyrrolidone were added. The reaction mixture is warmed to 245° C. under the preliminary nitrogen pressure of 2.5 bar in the course of 30 minutes, during which the pressure rises to 10 bar, and this temperature was maintained for 3 hours. After cooling to room temperature, a grey solid is isolated and is subsequently subjected to thorough washing with water to remove the inorganic concomitant materials.

The product is dried at 80° C. in vacuo to give 100.3 g (93%) of poly-p-phenylene sulphide with a melt viscosity of 20 Pa·s (measured at $10^2$ Pa and 306° C.).

Example 1a, b, c

The experiment from Example 1 is repeated three times and the melt viscosity is in each case determined after working up:
(a) $\eta_m = 13$ Pa·s
(b) $\eta_m = 6$ Pa·s
(c) $\eta_m = 27$ Pa·s When the experimental conditions remain constant, varying melt viscosity values result.

Example 2

856.75 g of sodium sulphide hydrate (about 60% pure), 135 g of sodium hydroxide solution and 108 g of caprolactam were metered into 2,100 g of N-methylcaprolactam, 940.8 g of p-dichlorobenzene and 8.08 g (0.5 mol %) of 4-chlorodiphenyl sulphone at a temperature of 220° C.

The rate of metering depends on the conversion and is adjusted so that the temperature of 220° C. can be maintained, with simultaneous additional heating of the reaction vessel. During metering, the water is simultaneously removed from the reaction.

After the metering, the reaction is kept under reflux for a further 4 hours and 1.76 g (0.25 mol %) of thiophenol in 50 ml of N-methylcaprolactam are then metered in. After a further reaction time of 3 hours, the PPS is precipitated in water, washed free from electrolyte and briefly extracted with an organic solvent. The dried p-polyphenylene sulphide has a melt viscosity of 41 Pa·s (measured at $10^2$ Pa and 306° C.).

Example 3

(Comparison)

This example is as Example 2, but without 4-chlorodiphenyl sulphone and without thiophenol. A melt viscosity $\eta_m = 680$ Pa·s (measured at $\tau = 10^2$ Pa and 306° C.) is achieved. This polyphenylene sulphide can be processed only with difficulty in the presence of relatively large amounts of mineral fillers or glass fibres because of its reduced flowability.

Example 4

This example is as Example 2; however, the thiophenol is already metered in after 2 hours 30 minutes. The p-polyphenylene sulphide obtained has a melt viscosity of 34 Pa·s (measured at $10^2$ Pa and 306° C.).

Example 5

This example is as Example 2, but with methyloxophospholane as the solvent. A p-polyphenylene sulphide with a melt viscosity of 37 Pa·s (measured at $10^2$ Pa and 306° C.) is obtained.

Example 6

This example is as Example 4; however, 12.1 g (0.75 mol %) of 4-chlorodiphenyl sulphone were initially taken and 1.76 g (0.25 mol %) of thiophenol in 50 ml of N-methylcaprolactam were added after a subsequent stirring time of 2 hours. A melt viscosity of 18 Pa·s (measured at $10^2$ Pa and 306° C.) is obtained. Repeating this experiment three times under the same conditions gives the melt viscosities (a) $\eta_m = 17$ Pa·s, (b) $\eta_m = 20$ Pa·s and (c) $\eta_m = 18$ Pa·s, with a good reproducibility.

Example 7

This example is as Example 2; however, 5.32 g (0.5 mol %) of 2-mercaptobenzothiazole in 50 ml of N-methylcaprolactam are added dropwise after a postcondensation time of 4 hours. The polyphenylene sulphide obtained after working up has a melt viscosity of $\eta m = 36$ Pa·s (at $\tau = 10^2$ Pa and 306° C.).

Example 8

This example is as Example 2; however, 2.66 g (0.25 mol %) of 2-mercaptobenzimidazole are taken and 8.08 g (0.5 mol %) of 4-chlorodiphenyl sulphone in 50 ml of N-methylcaprolactam are added after a subsequent stirring time of 2 hours. The polyphenylene sulphide thus obtained has a melt viscosity of $\eta m = 58$ Pa·s (at $\tau = 10^2$ Pa and 306° C.).

Corrosion

The corrosion was determined by titration of acid gas emissions from the corresponding polyphenylene sulphide samples in a stream of air at 350° C. in 1 hour.

| The corrosion factor f = Corrosion of the corresponding example/ Corrosion of Comparison Example 1 | |
|---|---|
| Example | f |
| 2 | 0.88 |
| 4 | 0.91 |
| 5 | 0.93 |
| 6 | 0.87 |
| 7 | 0.92 |
| 8 | 0.89 |

We claim:

1. A process for the preparation of high molecular weight branched or unbranched polyarylene sulphide which comprises reacting:

(a) 50–100 mol % of at least one dihalogenoaromatic of the formula

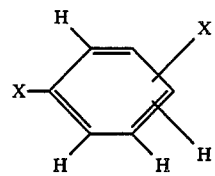

and 0–50 mol % of at least one dihalogenoaromatic of the formula

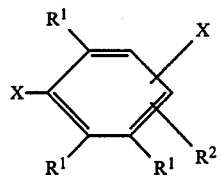

in which
the symbols X represent halogen, in the meta- or para-position relative to one another and
the symbols $R^1$ and $R^2$ are identical or different and each is hydrogen, $C_1$–$C_4$-alkylaryl, $C_7$–$C_{14}$-arylalkyl, and when two radicals $R^1$ in the ortho-position relative to one another are linked together, they form an aromatic ring or a heterocyclic ring containing one to 3 heteroatoms, and one radical $R^1$ is always other than hydrogen;

(b) 0–5 mol %, based on the sum of the dihalogenoaromatics of the formula I and II, of a tri- or tetrahalogenoaromatic of the formula $$\text{ArX}_n \qquad \qquad (III)$$

wherein
Ar is an aromatic $C_6$–$C_{14}$ radical or a heterocyclic radical with 5–14 ring atoms having one to 3 ring heteroatoms, X represents halogen, and
n represents the number 3 or 4, and (c) 50–100 mol % of an alkali metal sulphide or alkali metal sulphide mixed with small amounts of alkali metal hydroxide, and 0–50 mol % of an alkali metal bisulphide, with the molar ratio of (a+b):c in the range from 0.75:1 to 1.25:1, and conducting the reaction of (a), (b) and (c) in the presence of 0.05–5.0 mol %, of a monohalogenoaromatic compound of the formula IV $$\text{G—A—R} \qquad \qquad (IV)$$

and 0.05–5.0 mol %, of a monomercapto compound of the formula V $$(\text{R—A}^1\text{—S})_t\text{W} \qquad \qquad (V)$$

wherein G is a replaceable group comprising halogen, mesylate or tosylate,
A is an aliphatic, aromatic or heterocyclic radical with 6 to 30 carbon atoms,
R is hydrogen, $C_1$–$C_8$ alkyl, $C_3$–$C_6$ cycloalkyl, $C_7$–$C_{19}$ alkaryl or $C_7$–$C_{19}$ aralkyl,
t represents the number 1 or 2,
SW represents a mercapto or mercaptide group, W represents hydrogen, and alkali metal or NH$_4^+$, and, where t represents the number 2, W also represents an alkaline earth metal or zinc, A$^1$ represents a C$_1$–C$_{30}$ aliphatic or C$_6$–C$_{24}$ aromatic radical or a heterocyclic radical containing one to three heteroatoms.

2. Process according to claim 1 wherein for the compound of formula IV, A represents C$_1$–C$_{18}$-alkylidene,

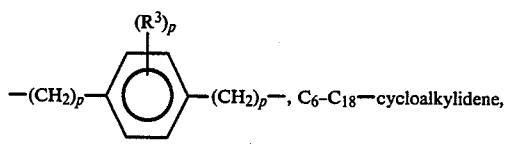, C$_6$–C$_{18}$—cycloalkylidene,

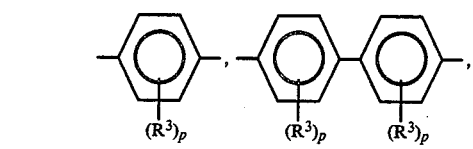

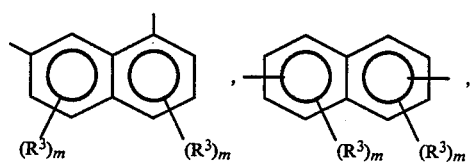

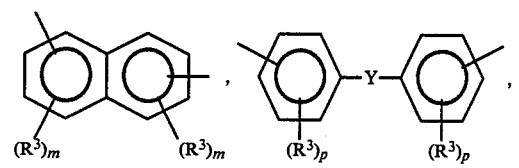

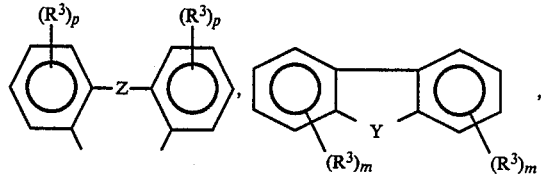

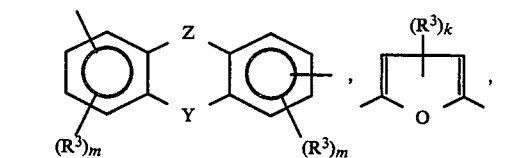

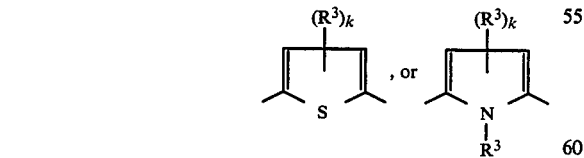

wherein
the radicals R$^3$ independently of one another each denote C$_1$–C$_8$-alkyl, C$_7$–C$_{19}$-alkaryl, C$_7$–C$_{19}$-aralkyl, C$_3$–C$_6$-cycloalkyl or hydrogen and Z represents C$_1$–C$_6$-alkylidene, C$_3$–C$_6$-cycloalkylidene, CO,

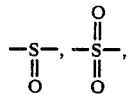

O or Z represents a chemical single bond and Y denotes O, NR$^3$, S, SO$_2$ or CO, and k represents the number 0, 1, or 2,
m represents the number 0, 1, 2, or 3, and
p represents the number 0, 1, 2, 3, or 4.

3. Process according to claim 1 wherein the reaction is carried out in the absence of water.

4. Process according to claim 1 wherein for the compound of formula V, A$^1$ represents C$_1$–C$_{18}$-alkylidene, C$_5$–C$_{18}$-cycloalkylidene,

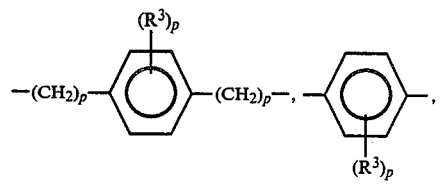

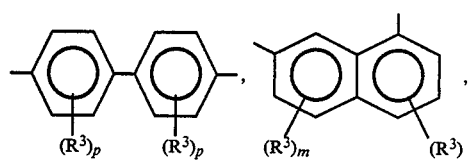

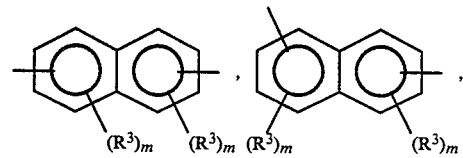

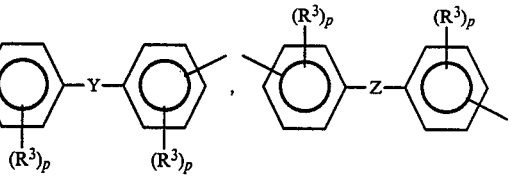

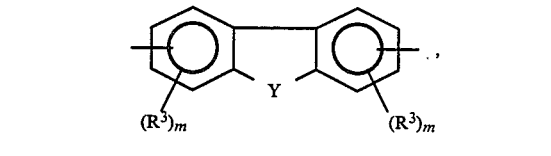

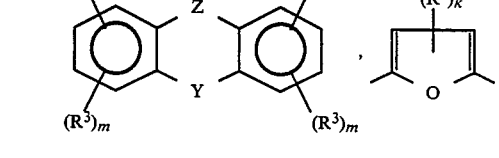

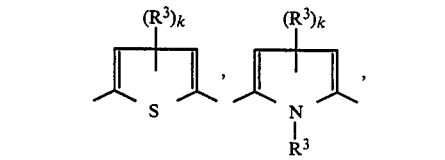

-continued

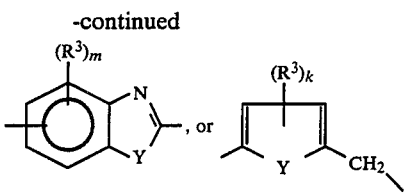

wherein
the radicals $R^3$ independently of one another each denote $C_1$–$C_8$-alkyl, $C_7$–$C_{19}$-alkaryl, $C_7$–$C_{19}$-aralkyl, $C_3$–$C_6$-cycloalkyl or hydrogen and Z represents $C_1$–$C_6$-alkylidene, $C_3$–$C_6$-cycloalkylidene, CO,

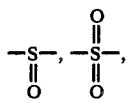

O or Z represents a chemical single bond and
Y denotes O, $NR^3$, S, $SO_2$ or CO; and
k represents the number 0, 1, or 2,
m represents the number 0, 1, 2, or 3, and
p represents the number 0, 1, 2, 3, or 4.

5. Process according to claim 1 wherein the monohalogenoaromatic is 4-chlorodiphenyl sulphone and the mercapto compound of the formula V is 2-mercaptobenzimidazole or 2-mercaptobenzothiazole.

6. Process according to claim 1 wherein the monohalogenoaromatic IV is 4-chlorodiphenyl sulphone and the compound V is thiophenol.

7. Process according to claim 1 wherein the monohalogenoaromatic IV is 4-chlorodiphenyl sulphone and the compound V is dodecylmercaptan.

8. Process according to claim 1 wherein N-methylcaprolactam is the polar solvent.

9. Process according to claim 1 wherein reactants (a), (b) and (c) and a polar solvents are brought together and reacted at temperatures $\geq 200°$ C., with simultaneous dehydration.

10. Process according to claim 1 wherein the amount of the compound of formula IV is 0.1 to 2.5 mol %.

11. Process according to claim 1 wherein the amount of the compound of formula V is 0.1 to 2.5 mol %.

12. Process according to claim 1 wherein the amount of the compound of formula IV is 0.05 to 2.5 mol % and the amount of the compound of formula V is 0.05 to 1.5 mol %.

* * * * *